United States Patent
Davis

(10) Patent No.: US 11,058,101 B1
(45) Date of Patent: Jul. 13, 2021

(54) FISHING LURE BOX KIT

(71) Applicant: Jason M. Davis, Tequesta, FL (US)

(72) Inventor: Jason M. Davis, Tequesta, FL (US)

( * ) Notice: Subject to any disclaimer, the term of this patent is extended or adjusted under 35 U.S.C. 154(b) by 150 days.

(21) Appl. No.: 15/964,564

(22) Filed: Apr. 27, 2018

Related U.S. Application Data

(60) Provisional application No. 62/491,323, filed on Apr. 28, 2017.

(51) Int. Cl.
*A01K 97/06* (2006.01)

(52) U.S. Cl.
CPC .................................. *A01K 97/06* (2013.01)

(58) Field of Classification Search
CPC ......... A01K 97/06; A01K 97/20; A01K 63/02
USPC ............. 43/54.1, 55; 119/201–203; 220/920; 206/315.11, 557–567, 503–513
See application file for complete search history.

(56) References Cited

U.S. PATENT DOCUMENTS

| | | | | |
|---|---|---|---|---|
| 1,639,555 A | * | 8/1927 | Clark ..................... | A01K 63/02 119/201 |
| 2,302,336 A | * | 11/1942 | MacDonald ........... | A01K 63/02 119/214 |
| 2,723,484 A | * | 11/1955 | Nelson, Jr. ............. | B65D 43/12 43/54.1 |
| 3,181,267 A | * | 5/1965 | Sawyer .................. | A01K 97/04 43/55 |
| 3,648,400 A | * | 3/1972 | Wolfe .................... | A01K 97/06 43/54.1 |
| 3,702,599 A | * | 11/1972 | Herolzer ................ | A01K 61/54 119/241 |
| 3,741,159 A | * | 6/1973 | Halaunbrenner ...... | A01K 61/54 119/240 |
| 4,007,709 A | * | 2/1977 | Wishner ................. | A01K 61/59 119/210 |
| 4,180,012 A | * | 12/1979 | Zenger, Sr. ............ | A01K 61/17 119/218 |
| 4,366,641 A | | 1/1983 | Price et al. | |
| 4,383,385 A | | 5/1983 | Myers | |
| 4,589,546 A | | 5/1986 | Sunderland | |
| 4,681,220 A | | 7/1987 | Beneke | |
| 4,756,412 A | | 7/1988 | Graves et al. | |
| 4,879,832 A | | 11/1989 | Nelson | |
| 4,892,241 A | * | 1/1990 | Mavrakis ............... | A01K 97/06 206/315.11 |

(Continued)

FOREIGN PATENT DOCUMENTS

CA    3025186 A1 * 12/2017 ............. A01K 61/90

*Primary Examiner* — Darren W Ark
*Assistant Examiner* — Katelyn T Truong
(74) *Attorney, Agent, or Firm* — John Rizvi; John Rizvi, P.A.—The Patent Professor®

(57) ABSTRACT

A fishing lure box kit for carrying and draining offshore trolling lures includes at least one draining tray having a tray bottom, tray sides extending from the tray bottom, a tray interior formed by the tray bottom and the tray sides and at least one tray opening in the tray bottom. One or more lure frames are provided in the tray interior of the draining tray. Each lure frame has a frame interior and an open frame top and frame bottom. One or more lure cases are provided in the one or more lure frames, respectively. Each of the lure cases has a case interior sized and configured to accommodate a fishing lure and a case bottom configured to support the fishing lure and provided with at least one opening configured to drain water from the case interior.

18 Claims, 7 Drawing Sheets

(56) References Cited

U.S. PATENT DOCUMENTS

| | | | |
|---|---|---|---|
| 4,958,730 A | 9/1990 | Bunten | |
| 5,117,777 A * | 6/1992 | Takasugi | A01K 63/02 |
| | | | 119/203 |
| 5,289,940 A * | 3/1994 | Wisenbaugh | A01K 97/06 |
| | | | 206/315.1 |
| 5,934,464 A | 8/1999 | Vargo et al. | |
| 6,273,309 B1 | 8/2001 | Oppelt | |
| 6,533,151 B1 | 3/2003 | Link | |
| 6,857,219 B2 | 2/2005 | Jang | |
| 7,328,813 B2 * | 2/2008 | Pfister | A01K 97/04 |
| | | | 220/507 |
| 7,587,855 B2 | 9/2009 | Konopa | |
| 8,016,106 B2 * | 9/2011 | Schmitt | A01K 97/06 |
| | | | 206/315.11 |
| 2002/0079313 A1* | 6/2002 | Grayson | A01K 97/06 |
| | | | 220/23.4 |
| 2004/0060844 A1* | 4/2004 | Stahl | B65D 21/046 |
| | | | 206/499 |
| 2006/0042152 A1* | 3/2006 | Pearson | A01K 97/06 |
| | | | 43/54.1 |
| 2006/0053681 A1* | 3/2006 | Hoover | A01K 97/06 |
| | | | 43/54.1 |
| 2007/0011939 A1* | 1/2007 | Sakai | A01K 97/06 |
| | | | 43/54.1 |
| 2010/0139566 A1* | 6/2010 | Lopuszanski | B65D 81/26 |
| | | | 119/6.7 |
| 2010/0257771 A1 | 10/2010 | Debono | |
| 2011/0119986 A1* | 5/2011 | Sellers | A01K 97/04 |
| | | | 43/54.1 |
| 2012/0211390 A1* | 8/2012 | Hassell | B65D 1/34 |
| | | | 206/510 |
| 2014/0124406 A1* | 5/2014 | Ishikawa | B65D 21/0213 |
| | | | 206/557 |
| 2015/0366172 A1* | 12/2015 | Garland | A01K 63/02 |
| | | | 119/234 |
| 2018/0007884 A1* | 1/2018 | Langley | B65D 43/12 |

\* cited by examiner

FISHING LURE BOX KIT

CROSS-REFERENCE TO RELATED APPLICATIONS

This application claims the benefit of U.S. Provisional Patent Application Ser. No. 62/491,323, filed on Apr. 28, 2017, which is incorporated by reference herein in its entirety.

FIELD OF THE INVENTION

The present invention relates generally to fishing lures, and more particularly, to a fishing lure box kit for carrying and draining offshore trolling lures to facilitate cleaning and drying of the lures between uses and prevent molding and rusting of the lures.

BACKGROUND OF THE INVENTION

Artificial fishing lures have been used for many years to entice fish to strike a fishing hook. Artificial fishing lures may include a hard or soft plastic lure body which is shaped in the configuration of a fish, worm, frog, crawfish or other water creature. The lure body may be tied to a fishing line that may be wound on a crank-operated reel on a fishing pole which is used to cast the fishing lure into a lake or other water body and retrieve the fishing lure through the surface of the water body by operation of the crank. The fishing lure may have a particular size, shape, color and appearance which is suited to catching fish of a desired type.

A challenge which is commonly encountered by fisherpersons is that of storing, organizing or categorizing, and transporting multiple fishing lures. Conventional tackle boxes are typically used to store and transport fishing lures. Tackle boxes may include a case having a hinged lid attached to a base. One or multiple shelves may be hinged to the interior of the case and the lid such that the shelves are deployed in a stepped configuration upon opening the lid on the case. A lure box having multiple lure compartments may be supported on each shelf. The fishing lures may be placed in the respective lure compartments in the lure box. Thus, the lures may be organized in the lure box according to size, color and appearance as well as the type of fish each is designed to attract.

One of the drawbacks of conventional tackle boxes used to store fishing lures is that the lure compartments in the lure box have a closed bottom and sides. Thus, when a lure is placed in the lure compartment after use, water typically drips off the lure into the lure compartment. Thus, the lure compartment often does not completely dry between uses, resulting in contamination and deterioration of the lure compartments and lures.

Some current products which are known in the market for storing and transporting offshore fishing lures are commonly formed as a roll-up bag made out of a strong fabric (e.g., Cordura®). A common limitation, however, of these devices is that the bags do not allow the housing spaces to breathe. In consequence, the lures do not dry off completely and may become deteriorated ahead of time.

Accordingly, there remains a need for a fishing lure carrying and storage device which minimizes or prevents deterioration of fishing lures due to water and humidity in the vicinity of the lures.

SUMMARY OF THE INVENTION

The present invention is directed to a fishing lure box kit for carrying and draining offshore trolling lures. The fishing lure box kit may facilitate cleaning and drying of the lures between uses to prevent molding and rusting of the lures. The fishing lure box kit may include at least one draining tray. The draining tray may have a tray interior and one or more bottom tray openings which communicate with the tray interior. One or more lure frames may be placed in the tray interior. Each lure frame may have an open top and bottom. A lure case may be placed in each lure frame. Each lure case may include a permeable case bottom. The lure case may be sized and configured to receive a fishing lure. Accordingly, a fishing lure can be placed in the lure case after use. Water from the fishing lure drains from the fishing lure through the permeable case bottom of the lure case, the open bottom of the lure frame and one of the tray opening(s) in the draining tray, respectively. Thus, the fishing lures remain dry while they are stored until their subsequent use.

Introducing a first embodiment of the invention, the present invention includes a fishing lure box kit for carrying and draining offshore trolling lures, comprising:

at least one draining tray having a tray bottom, tray sides extending from the tray bottom, a tray interior formed by the tray bottom and the tray sides and one or more tray openings in the tray bottom;

one or more lure frames provided in the tray interior of the draining tray, the one or more lure frames each having a frame interior, an open frame top and an open frame bottom; and one or more lure cases in the one or more of lure frames, respectively, each of the one or more lure cases having a case interior sized and configured to accommodate a fishing lure, and a case bottom that is configured to support the fishing lure and is permeable and configured to drain water therethrough from the case interior.

In a second aspect, the at least one draining tray can include multiple stackable draining trays. In some embodiments, the multiple stackable draining trays are configured to adopt a stacked configuration in which the one or more tray openings in the tray bottoms of the multiple stackable draining trays are in vertical alignment. Alternatively or additionally, each of the draining trays can include a set of tray legs. In some embodiments, each of the draining trays can include supporting surfaces for receiving the set of tray legs of another one of the draining trays which is stacked thereon. The supporting surfaces can optionally be comprised in respective flanges extending laterally and outwardly form the tray sides.

In another aspect, each lure frame of the one or more lure frames can include a pair of parallel, spaced-apart frame sides and a pair of frame ends connecting the frame sides, the frame sides and frame ends delimiting the frame interior.

In another aspect, the one or more lure frames can include a plurality of lure frames configured to snugly fit within the tray interior with the plurality of lure frames in a side-by-side arrangement relative to one another.

In another aspect, the one or more lure frames can be provided in the tray interior such that the open frame bottom is in vertical registration with the one or more openings in the tray bottom and such that water is drainable through the open frame bottom and said one or more openings.

In another aspect, the case bottom of each of the one or more lure cases can be in vertical registration with the open frame bottom of a respective lure frame inside which said each of the one or more lure cases is placed, such that water is drainable through the case bottom of said each of the one or more lure cases and the open frame bottom of said respective lure frame.

In another aspect, the case bottom of the lure case can be meshed.

In another aspect, the lure case can further include a pair of parallel, spaced-apart case sides and a pair of case ends connecting the case sides. The case bottom can extend between the case sides and the case ends. In some embodiments, the lure case can further include a case flap for opening and closing the case interior. The case flap can be configured to adopt a closed position in which the case flap is arranged opposite to the case bottom. Alternatively or additionally, the case flap can be permeable; for instance and without limitation, the case flap can be meshed.

In another aspect, one or more of the case sides and case ends can be permeable. For instance and without limitation, one or more of the case sides and the case ends can be meshed.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a fishing lure box kit for carrying and draining offshore trolling lures. The fishing lure box kit is suitable for cleaning and drying fishing lures between uses to prevent molding and rusting of the lures.

Figure 1:
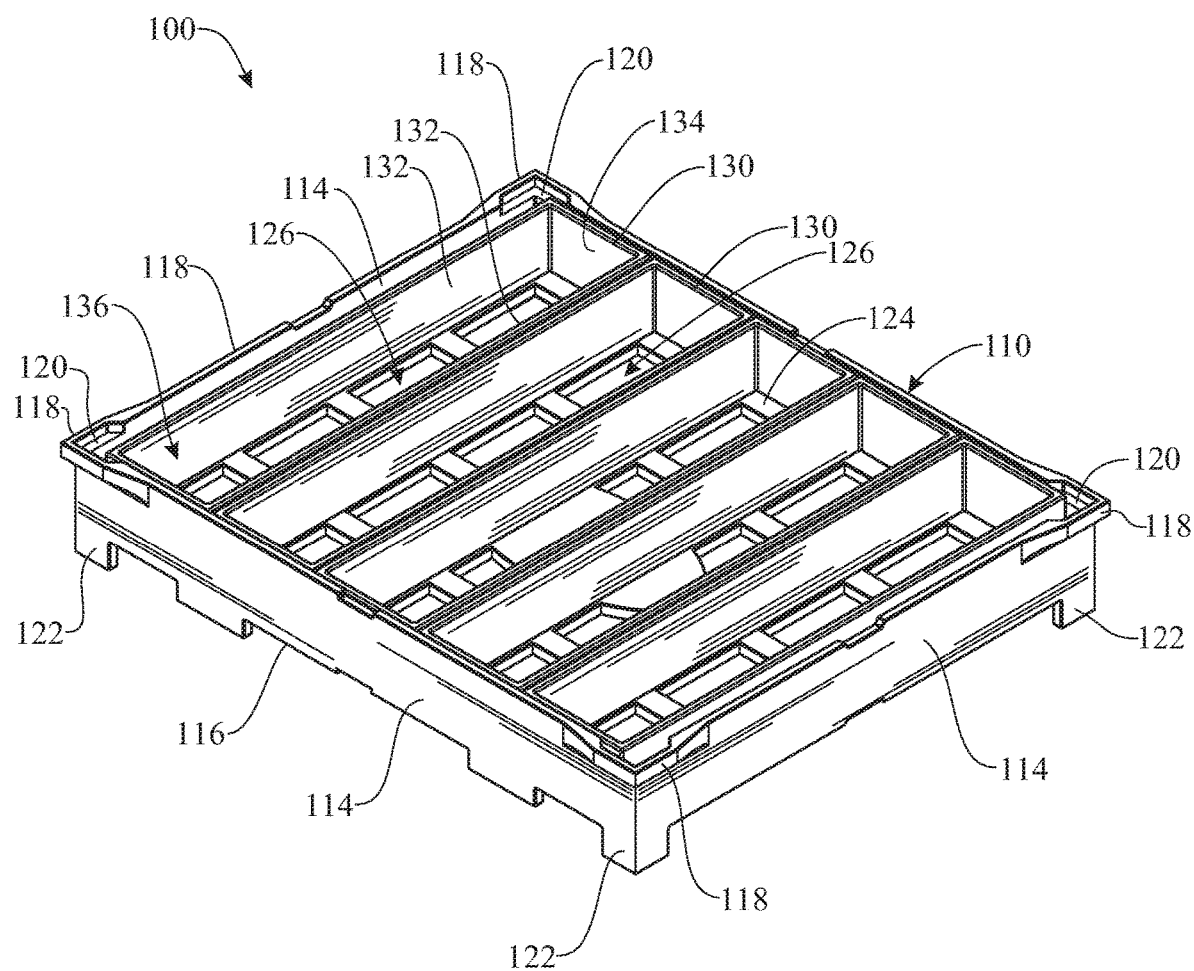
FIG. 1 presents a perspective view of a draining tray with multiple lure frames fitted in the draining tray according to an illustrative embodiment of the fishing lure box kit of the present invention.
Figure 2:
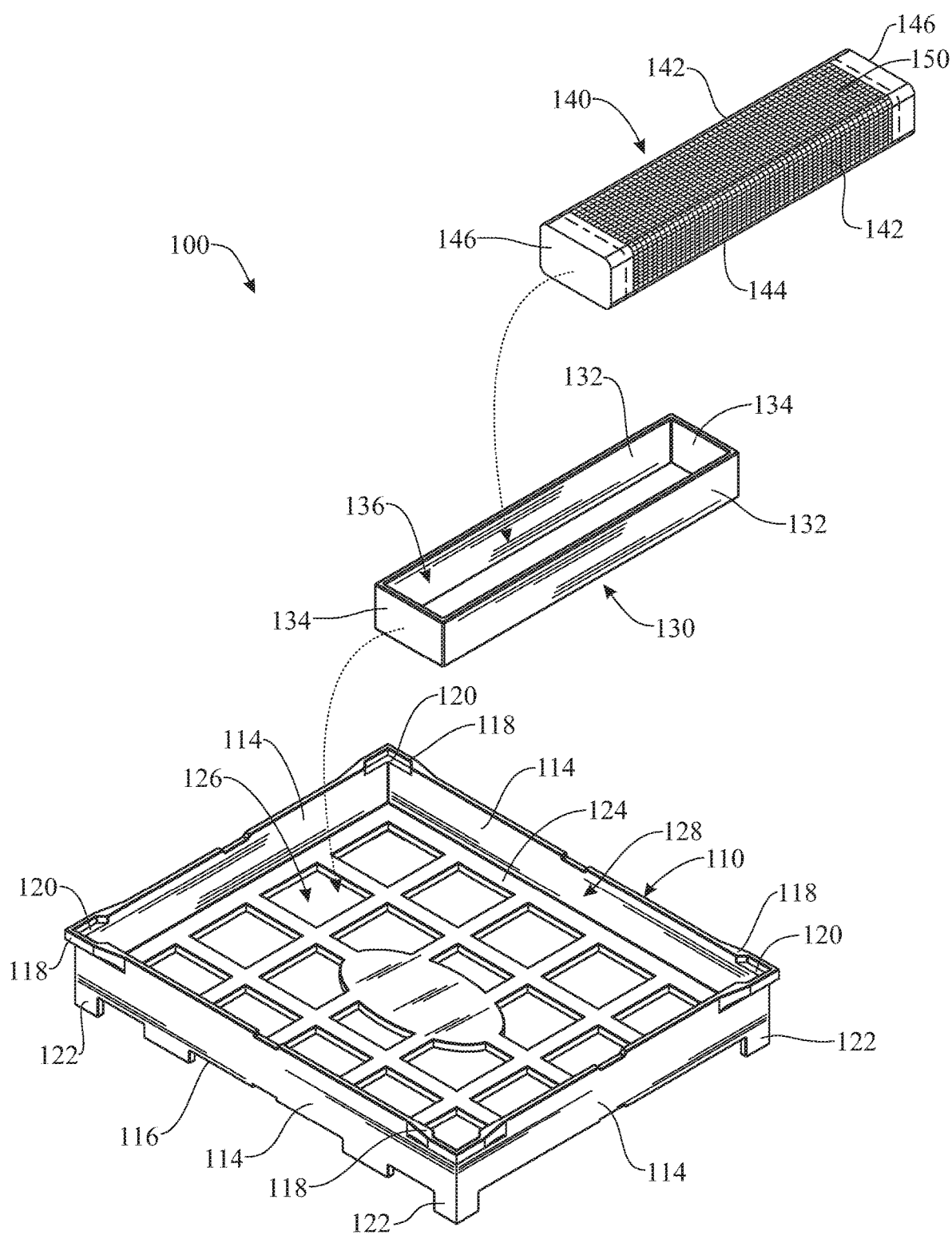
FIG. 2 presents an exploded perspective view of the placement of a lure frame in the draining tray, and the placement of a lure case according to an illustrative embodiment of the fishing lure box set of the present invention in the lure frame.

Referring initially to FIGS. 1 and 2, a fishing lure box kit 100 is illustrated in accordance with an exemplary embodiment of the present invention. As shown, the fishing lure box kit 100 may include at least one draining tray 110. The draining tray 110 may include a tray bottom 124. Multiple tray openings 126 may extend through the tray bottom 124 in a selected size, number, spacing and pattern. Tray sidewalls or sides 114 may extend from the tray bottom 124. As illustrated in FIG. 2, a tray interior 128 may be formed by and between the tray bottom 124 and the tray sides 114. In some embodiments, L-shaped tray legs 122 may extend from the tray bottom 124 at respective corners of the draining tray 110. The tray sides 114 and the L-shaped tray legs 122 may extend vertically upward and downward, respectively, from the tray bottom 124, as shown in FIGS. 1 and 2. Tray flanges 118 may be provided in the tray sides 114 at the corners of the draining tray 110, extending horizontally outward from the tray sides 114. Upwardly facing L-shaped supporting surfaces 120 may be comprised within and extend along the respective tray flanges 118. Each supporting surface 120 may be suitably sized and configured to support a corresponding tray leg 122 so that each tray flange 118 can accommodate and support the tray leg 122 of an overlying draining tray 110 in stacking of the draining trays 110, as will be hereinafter described. Wall indentations or slots 116 may be provided in the lower surfaces of the tray sides 114 for purposes which will be hereinafter described. The draining tray 110 may be fabricated in various lengths and widths in different embodiments of the invention.

One or more lure frames 130, and preferably multiple lure frames 130 as shown in FIG. 1, may be placed in the tray interior 128 of the draining tray 110. In some embodiments, two or more removable lure frames 130 (e.g., five lure frames 130, as shown) may be placed in adjacent or side-by-side relationship to each other in the tray interior 128. Each lure frame 130 may have a length which generally corresponds to a width of the tray interior 128. The tray interior 128 and the lure frames 130 may be suitably sized in such a manner that a selected number of the lure frames 130 may be placed in the tray interior 128. In the non-limiting example illustrated in FIG. 1, five lure frames 130 are placed side-by-side in the tray interior 128. Each lure frame 130 may be selectively and independently removable from the tray interior 128. In some embodiments, the lure frames 130 may be configured to fit in the tray interior 128 in a friction-fit or interference-fit. In other embodiments, each lure frame 130 may be configured to snap-fit into or otherwise be removably retained in the tray interior 128 according to the knowledge of those skilled in the art.

As illustrated in FIG. 2, each lure frame 130 may be generally elongated and rectangular in shape. The lure frame 130 may include a pair of generally elongated, parallel, spaced-apart frame sidewalls or sides 132. At opposite ends of the lure frame 130, a pair of frame end walls or ends 134 may connect the frame sides 132. A frame interior 136 may be formed by and between the frame sides 132 and the frame ends 134. The lure frame 130 may have an open frame top and an open frame bottom which communicate with the frame interior 136.

Figure 3:
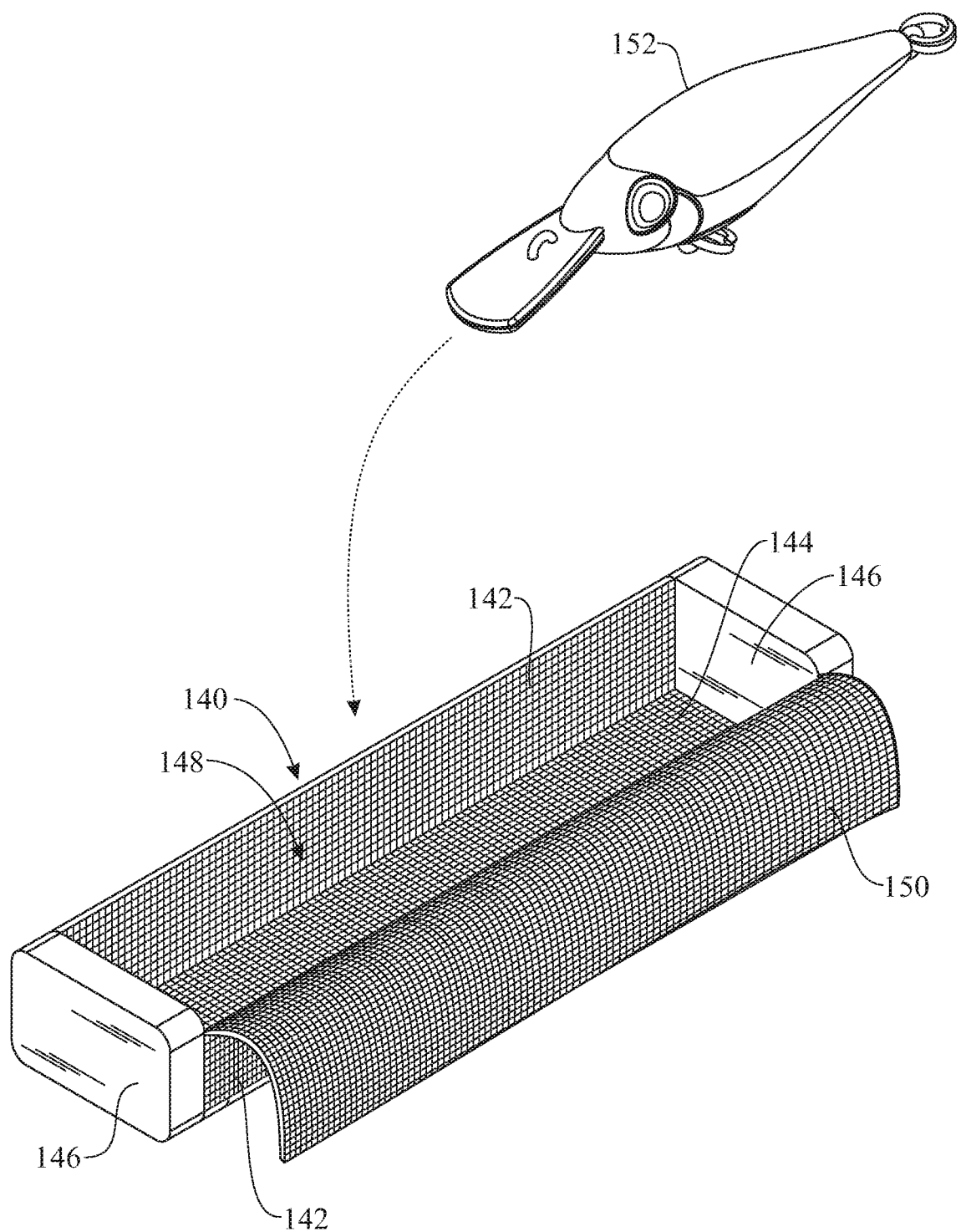
FIG. 3 presents an exploded perspective view illustrating the placement of a fishing lure in the lure case.
Figure 4:
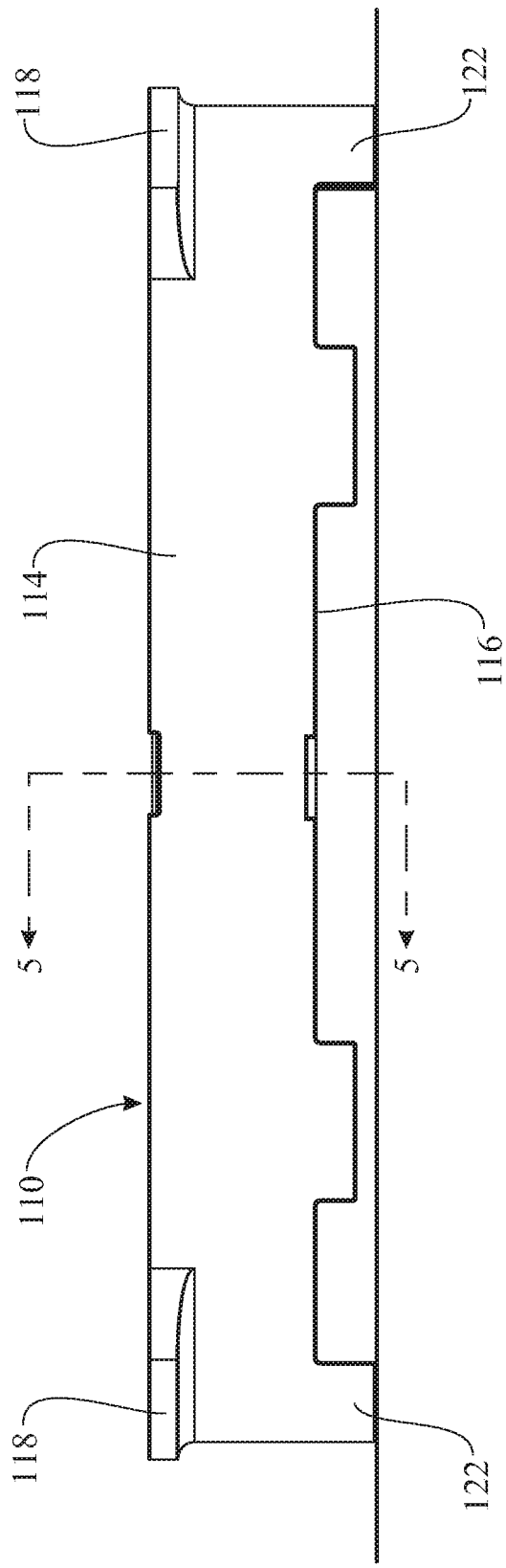
FIG. 4 presents a side elevation view of the draining tray of FIG. 1, shown resting on a floor or surface.

A lure case 140 may be suitably sized and configured to fit inside the frame interior 136 of each lure frame 130. In some embodiments, each lure case 140 may be configured to fit in the frame interior 136 in a friction-fit or interference-fit. In other embodiments, each lure case 140 may be configured to snap-fit into or otherwise be removably retained in the frame interior 136 according to the knowledge of those skilled in the art. In some embodiments, the lure case 140 may loosely fit within the frame interior 136, facilitating insertion and removal of the lure case 140 into and from the frame interior 136. As illustrated in FIG. 3, in some embodiments, the lure case 140 may be generally elongated and rectangular in shape. The lure case 140 may include a case bottom 144. A pair of parallel, spaced-apart case sidewalls or sides 142 and a pair of case end walls or ends 146 at opposite ends of the case sides 142 may extend from the case bottom 144. A case interior 148 may be formed by the case sides 142, the case bottom 144 and the case ends 146. The case interior 148 may be suitably sized and configured to contain a fishing lure 152, such as an offshore trolling lure, for example and without limitation. A case flap 150 may extend from one of the case sides 142. The case flap 150 may be selectively deployed to an open position, as illustrated in FIG. 3, to facilitate placement of the fishing lure 152 into the case interior 148 and removal of the fishing lure 152 from the case interior 148. The case flap 150 may be selectively deployed to a closed position, shown in FIG. 2, in order to close the case interior 148 and enclose the fishing lure 152 in the case interior 148. Switching between the open and closed positons is reversible. In some embodiments, the case flap 150 may be secured in the closed position via a hook-and-loop fastener, magnet, snap fastener or other suitable closure securing mechanism known by those skilled in the art.

The case bottom 144 of the lure case 140 may be permeable, such as by including a screen or mesh material having mesh openings (not numbered). The case bottom 144 may be fabricated of a rubber, vinyl or other water-resistant mesh material, for example and without limitation. In some embodiments, the case sides 142 and/or the case flap 150 may also be permeable, such as by including a screen or mesh material. In some embodiments, the top side of the lure case 140 (in the present embodiment, the case flap 150) arranged opposite to the meshed case bottom 144 may include a window made of a transparent material to enable a user to view and identify the fishing lure 152 contained in the case interior 148.

Figure 6:
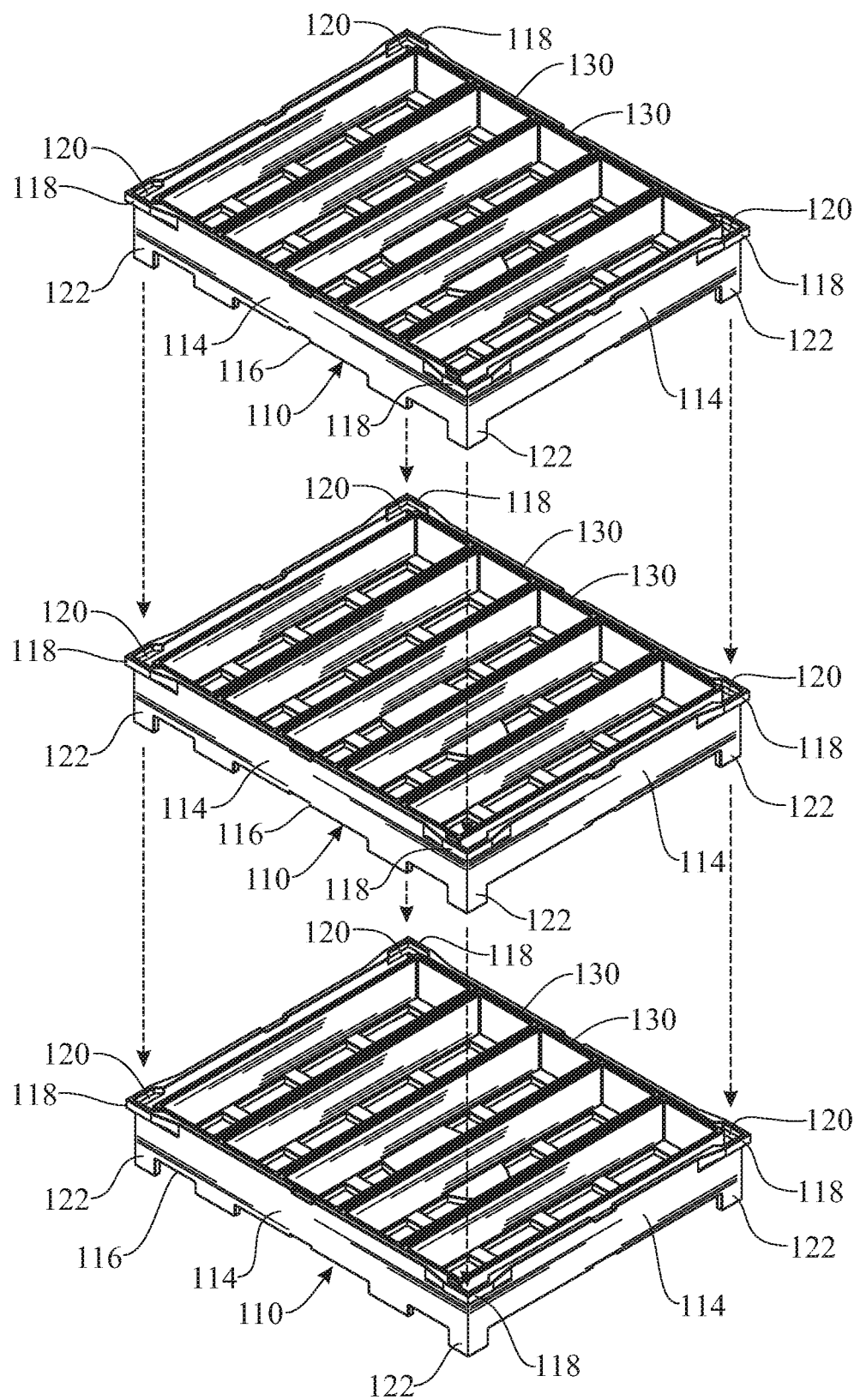
FIG. 6 presents a perspective view illustrating typical stacking of multiple draining trays for storage according to an illustrative embodiment of the fishing lure box set of the present invention.
Figure 7:
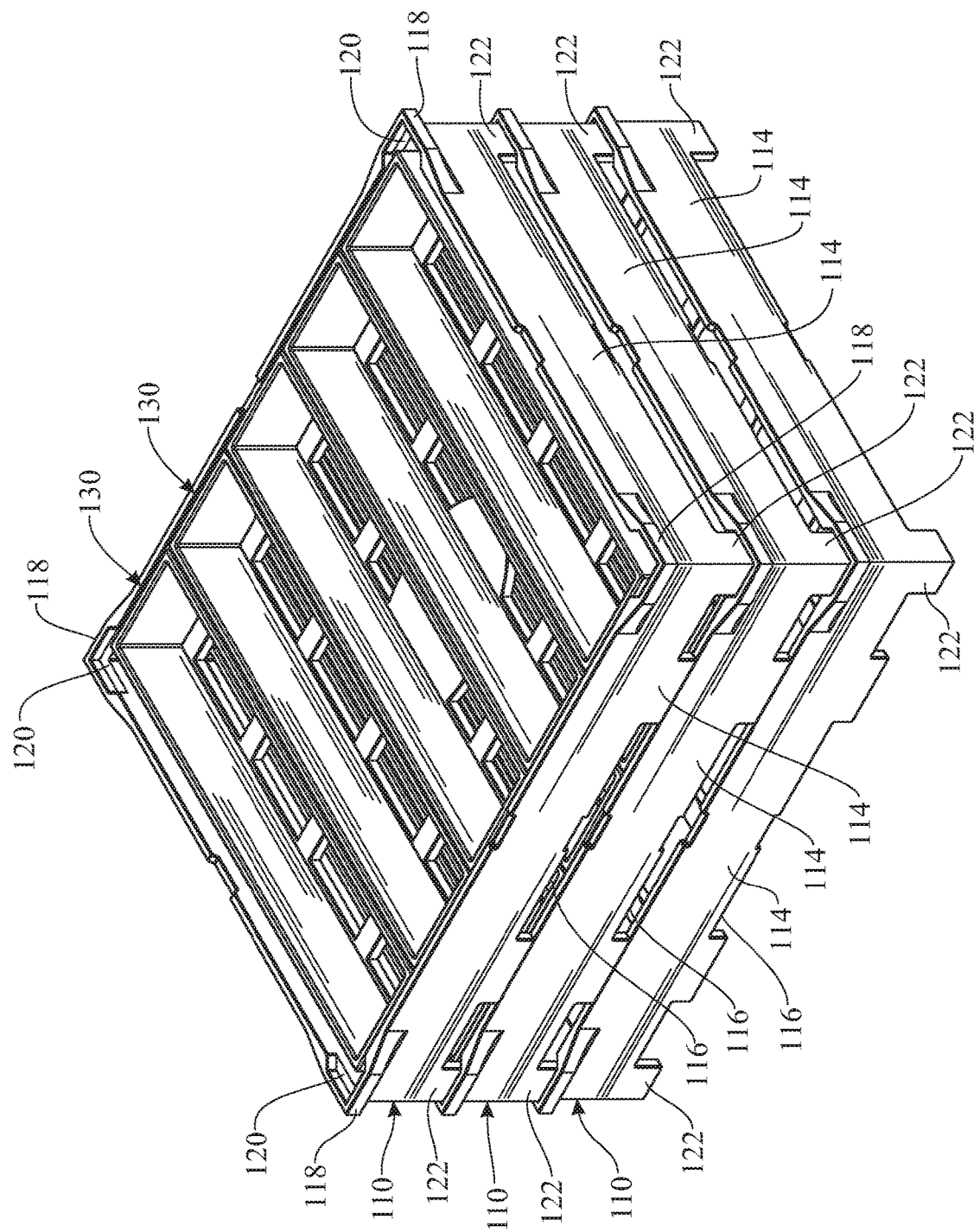
FIG. 7 presents a perspective view of the multiple draining trays of FIG. 6, shown stacked for storage.

As illustrated in FIGS. 6 and 7, in some embodiments, multiple draining trays 110 may be capable of being stacked or nested. Accordingly, the tray legs 122 of each draining tray 110 may be fitted onto the respective tray flanges 118 and supported on the respective supporting surfaces 120 at the corners of an underlying draining tray 110. Thus, multiple draining trays 110, either with or without the lure frames 130 and/or the lure cases 140 contained therein, can be stacked on top of each other to facilitate space-efficient storage and/or transport of the draining trays 110. The wall slots 116 may create gaps between the stacked draining trays 110 to allow a user to easily grip and separate the draining trays 110. As shown in FIG. 6, when the multiple draining trays 110 are stacked, the tray openings 126 of the tray bottoms 124 of the stacked draining trays 110 are in vertical registration, i.e. vertically aligned, to facilitate water draining from the top draining tray 110 to, and through, the bottom draining tray 110. Furthermore, the open bottoms and tops of the lure frames 130 of the multiple draining trays 110 can be vertically aligned, as shown, to also facilitate said draining.

In typical application of the fishing lure box kit 100, fishing lures 152 may be placed in the case interiors 148 of the respective lure cases 140, as illustrated in FIG. 3. The case flap 150 may be closed to conceal the fishing lure 152 in each lure case 140. Multiple lure frames 130 may be placed in the tray interior 128 of the draining tray 110. The lure cases 140, each containing a fishing lure 152, may be inserted through the open frame tops and placed in the frame interiors 136 of the respective lure frames 130. In some applications, multiple draining trays 110 may be stacked on top of each other to facilitate space-efficient storage of the fishing lures 152, as was heretofore described with respect to FIGS. 6 and 7.

In the event that use of a fishing lure 152 is desired, the lure case 140 which contains that fishing lure may be removed from its corresponding lure frame 130. The case flap 150 may be opened on the lure case 140 and the fishing lure 152 removed from the case interior 148. Alternatively, the fishing lure box kit 100 may be used only to wash and dry the fishing lures 152 between uses, as will be hereinafter described, in which case the fishing lures 152 may be contained and organized or categorized in a conventional tackle box (not illustrated) preparatory to use.

After use, each fishing lure 152 may be replaced in its lure case 140, the case flap 150 closed and the lure case 140 replaced in the frame interior 136 of its corresponding lure frame 130. The fishing lures 152 can then be washed such as by immersing the lure cases 140 in a container of water (not illustrated). Thus, water enters the case interior 148 of the lure case 140 through the permeable, meshed case bottom 144, and may additionally enter the case interior 148 through the case sides 142 and the case flap 150 (in the event that they are also permeable), to wash dirt, moss, seaweed, salt and/or other impurities from the fishing lures 152. Alternatively, the lure cases 140 can be sprayed with water or other rising liquid through the case sides 142 and case flap 150 onto the fishing lure 152 in the case interior 148. Alternatively or additionally, the fishing lure 152 and/or lure case 140 may be washed separately before placing the fishing lure 152 inside the lure case 140. It will be appreciated by those skilled in the art that the lure cases 140 prevent the fishing hooks on the fishing lures 152 from becoming entangled with each other during washing.

Figure 5:
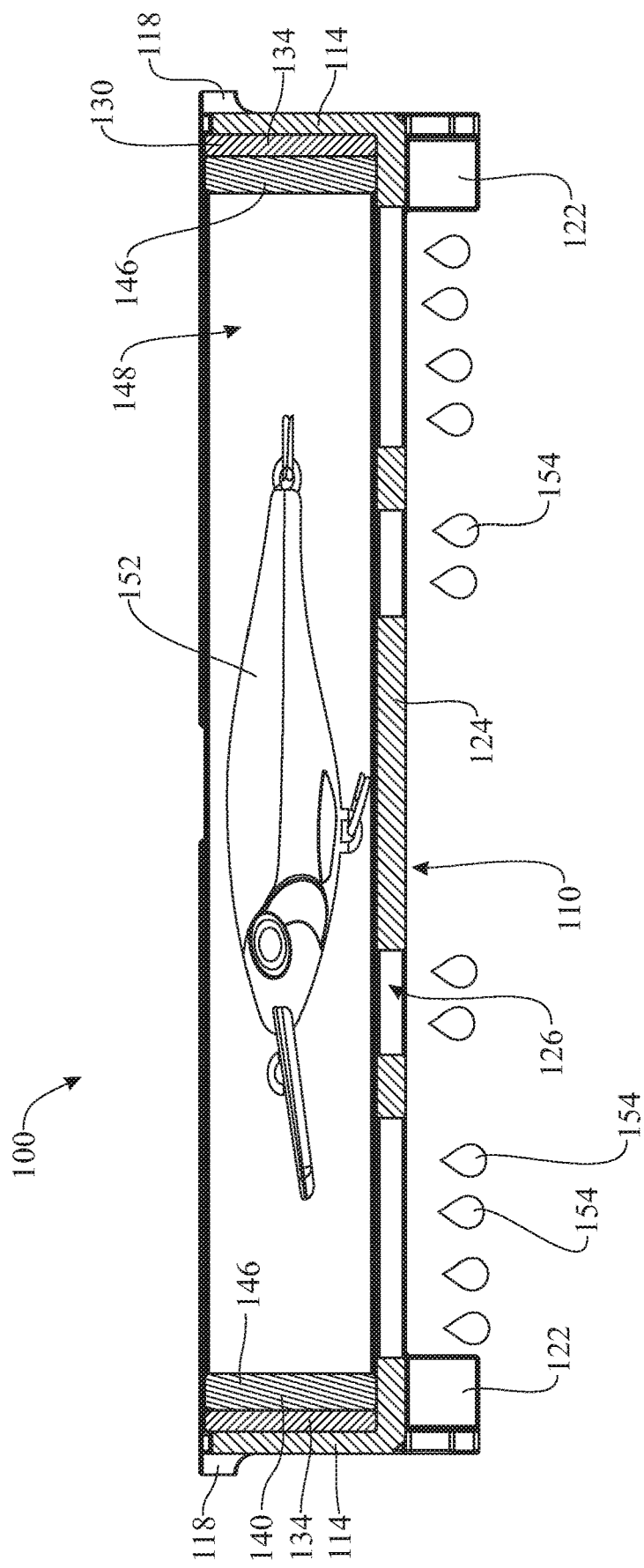
FIG. 5 presents a cross-sectional side elevation view of the draining tray of FIG. 1, the section taken along section plane 5-5 indicated in FIG. 4, showing the relative placement of the draining tray, lure frame, lure case and fishing lure, and illustrating water being drained away from the fishing lure.

After washing, the lure cases 140 with the washed fishing lures 152 contained inside may be placed in the respective lure frames 130 which lie in the tray interior 128 of the draining tray 110 to dry the fishing lures 152. Accordingly, as illustrated in FIG. 5, water 154 which remains on the fishing lures 152 and within the lure cases 140 after washing drains from the fishing lures 152 through the case bottom 144 (FIG. 3) of the lure cases 140 and then through the open frame bottom of the lure frames 130 and further through the tray openings 126 in the tray bottom 124 of the draining tray 110, respectively. In addition, air enters the case interior 148 through the case bottom 144, and may additionally enter the case interior 148 through the case sides 142 and the case flap 150. Thus, the fishing lures 152 are clean and dry when they are subsequently used, preventing molding and rusting of the fishing lures 152 as commonly occurs with conventional fishing lure storage products. The lure cases 140 are easy to insert into and remove from the frame interiors 136 of the respective lure frames 130 in the draining tray 110. Furthermore, a user can easily view which fishing lures 152 are in which draining tray 110, through the meshed or transparent top side (case flap 150) of each lure case 140, creating less inventory on a boat (not illustrated) and easing up more storage space.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A fishing lure box kit for carrying and draining offshore trolling lures, comprising:
    at least one draining tray having a tray bottom, tray sides extending from the tray bottom, a tray interior formed by the tray bottom and the tray sides and one or more tray openings in the tray bottom configured to drain water therethrough from the tray interior;
    one or more lure frames provided in the tray interior of the at least one draining tray, the one or more lure frames each comprising a pair of parallel, spaced-apart frame sides and a pair of frame ends connecting the frame sides, the frame sides and frame ends delimiting a frame interior, an open frame top and an open frame bottom; and
    one or more lure cases in the one or more lure frames, respectively, each lure case of the one or more lure cases having: a case interior sized and configured to accommodate a fishing lure, and a case bottom that is configured to support the fishing lure and is permeable and configured to drain water therethrough from the case interior.

2. The fishing lure box of claim 1, wherein the at least one draining tray comprises multiple stackable draining trays.

3. The fishing lure box of claim 2, wherein the multiple stackable draining trays are configured to adopt a stacked configuration in which the one or more tray openings in the tray bottoms of the multiple stackable draining trays are in vertical alignment.

4. The fishing lure box of claim 2, wherein each draining tray of the multiple stackable draining trays comprises a set of tray legs.

5. The fishing lure box of claim 4, wherein each draining tray of the multiple stackable draining trays comprises supporting surfaces for receiving the set of tray legs of another draining tray of the multiple stackable draining trays which is stacked thereon.

6. The fishing lure box of claim 5, wherein the supporting surfaces are comprised of respective flanges extending laterally and outwardly from the tray sides.

7. The fishing lure box of claim 1, wherein the one or more lure frames comprise a plurality of lure frames configured to snugly fit within the tray interior with the plurality of lure frames in a side-by-side arrangement relative to one another.

8. The fishing lure box of claim 1, wherein the one or more lure frames are provided in the tray interior such that the open frame bottom is in vertical registration with the one or more tray openings in the tray bottom and such that water is drainable through the open frame bottom and said one or more tray openings.

9. The fishing lure box of claim 1, wherein the case bottom of each of the one or more lure cases is in vertical registration with the open frame bottom of a respective lure frame of the one or more lure frames inside which said each of the one or more lure cases is placed, such that water is drainable through the case bottom of said each of the one or more lure cases and the open frame bottom of said respective lure frame.

10. The fishing lure box of claim 1, wherein the case bottom of said each lure case is meshed.

11. The fishing lure box of claim 1, wherein each of the one or more lure cases further comprises a pair of parallel, spaced-apart case sides and a pair of case ends connecting the case sides, and wherein the case bottom extends between the case sides and the case ends.

12. The fishing lure box of claim 11, wherein said each lure case further comprises a case flap for opening and closing the case interior.

13. The fishing lure box of claim 12, wherein the case flap is configured to adopt a closed position in which the case flap is arranged opposite to the case bottom.

14. The fishing lure box of claim 12, wherein the case flap is permeable.

15. The fishing lure box of claim 14, wherein the case flap is meshed.

16. The fishing lure box of claim 11, wherein one or both of the case sides are permeable.

17. The fishing lure box of claim 16, wherein one or both of the case sides are meshed.

18. A fishing lure box kit for carrying and draining offshore trolling lures, comprising:
    a draining tray having a tray bottom, tray sides extending from the tray bottom, a tray interior formed by the tray bottom and the tray sides and one or more tray openings in the tray bottom configured to drain water therethrough from the tray interior;
    one or more lure frames, the one or more lure frames each comprising a pair of parallel, spaced-apart frame sides and a pair of frame ends connecting the frame sides, the frame sides and frame ends delimiting a frame interior, an open frame top and an open frame bottom; and
    one or more lure cases, the one or more lure cases each having a case interior sized and configured to accommodate a fishing lure, and a case bottom that is configured to support the fishing lure and is permeable and configured to drain water therethrough from the case interior; wherein
    the fishing lure box kit is configured to adopt a working position in which:
        the one or more lure frames are arranged within the tray interior, with the open frame bottom of the one or more lure frames arranged in vertical alignment with the one or more tray openings in the tray bottom such that water is drainable through the open frame bottom and said one or more tray openings, and further in which
        the one or more lure cases are contained within the one or more lure frames, with the case bottom of each lure case of the one or more lure cases arranged in vertical alignment with the open frame bottom of a respective lure frame of the one or more lure frames inside which said each lure case is contained, such that water is drainable through the case bottom of said each lure case of the one or more lure cases and the open frame bottom of said respective lure frame.

* * * * *